June 10, 1958 R. M. TERRY ET AL 2,838,075

WIRE FLATTENING, HOOKING AND FEEDING DEVICE

Filed Oct. 30, 1953 7 Sheets-Sheet 1

INVENTORS
ROLAND M. GARDNER
ROGER M. TERRY
BY Joseph C. Ryan
ATTORNEY

WIRE FLATTENING, HOOKING AND FEEDING DEVICE

INVENTORS
ROLAND M. GARDNER
ROGER M. TERRY
BY Joseph C. Ryan
ATTORNEY

WIRE FLATTENING, HOOKING AND FEEDING DEVICE

Filed Oct. 30, 1953 7 Sheets-Sheet 3

INVENTORS
ROLAND M. GARDNER
ROGER M. TERRY
BY Joseph C. Ryan
ATTORNEY

WIRE FLATTENING, HOOKING AND FEEDING DEVICE
Filed Oct. 30, 1953 7 Sheets-Sheet 4
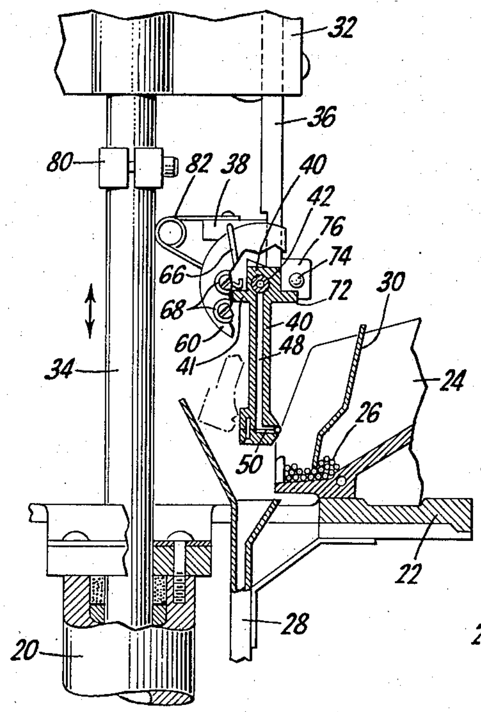
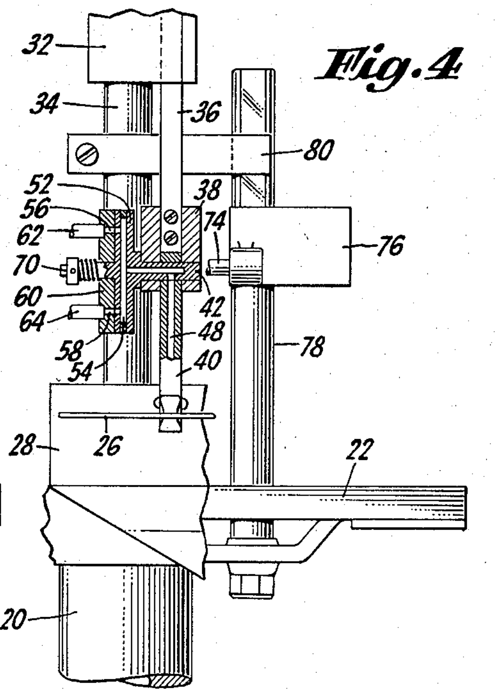
Fig.4
Fig.3
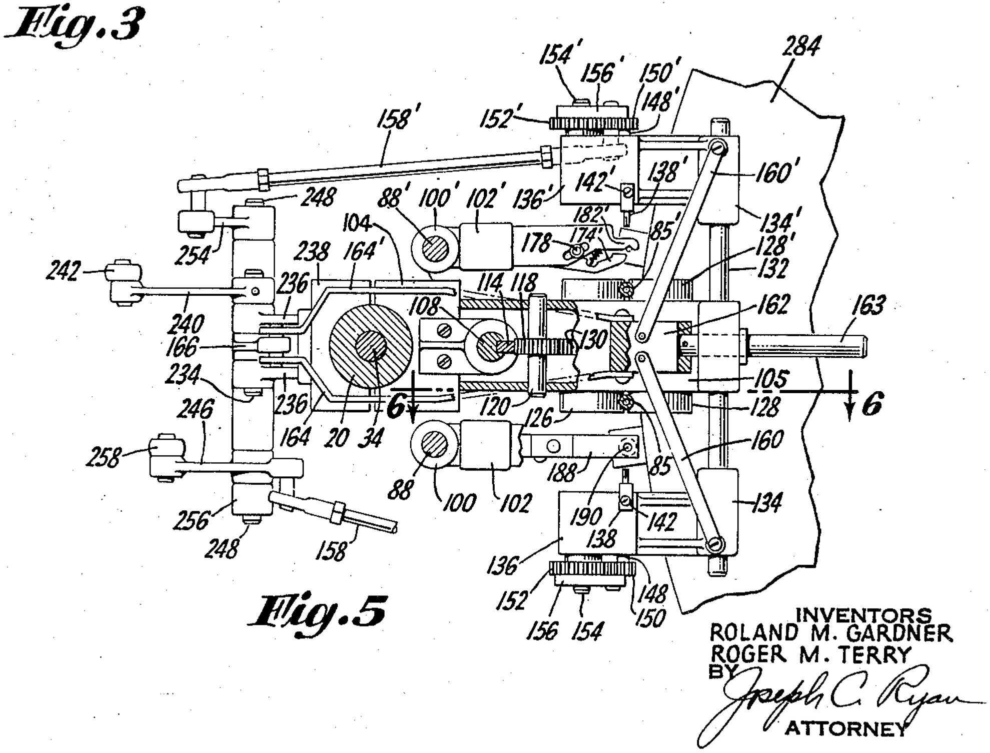
Fig.5
INVENTORS
ROLAND M. GARDNER
ROGER M. TERRY
BY Joseph C. Ryan
ATTORNEY

WIRE FLATTENING, HOOKING AND FEEDING DEVICE

INVENTORS
ROLAND M. GARDNER
ROGER M. TERRY
BY Joseph C. Ryan
ATTORNEY

June 10, 1958 R. M. TERRY ET AL 2,838,075

WIRE FLATTENING, HOOKING AND FEEDING DEVICE

Filed Oct. 30, 1953 7 Sheets-Sheet 6

INVENTORS
ROLAND M. GARDNER
ROGER M. TERRY
BY Joseph C. Ryan
ATTORNEY

WIRE FLATTENING, HOOKING AND FEEDING DEVICE

Filed Oct. 30, 1953 7 Sheets-Sheet 7

INVENTORS
ROLAND M. GARDNER
ROGER M. TERRY
BY Joseph C. Ryan
ATTORNEY

United States Patent Office 2,838,075

Patented June 10, 1958

2,838,075

WIRE FLATTENING, HOOKING, AND FEEDING DEVICE

Roger M. Terry, Ipswich, and Roland M. Gardner, Swampscott, Mass., assignors to Sylvania Electric Products Inc., Salem, Mass., a corporation of Massachusetts Application October 30, 1953, Serial No. 389,366

2 Claims. (Cl. 140—71.6)

This invention relates to the manufacture of electrical devices and more particularly to the manufacture of stems and the like for electrical devices such as lamps.

In the manufacture of stems for certain types of incandescent lamps, for example, it is the general practice to form hooks on the ends of the lead wires and to mount the lamp filament on the hooks. The development of a satisfactory apparatus for selecting and feeding hooked lead wires individually from a supply thereof to a lamp stem machine has not been too successful, primarily because of the difficulty in keeping the hooked portion of one lead wire from interlocking with other lead wires in the supply and thus causing malfunction of the mechanism employed to select and feed the lead wires individually. Manual feeding of hooked lead wires to the heads of a lamp stem machine is a relatively expensive operation, avoidance of which is highly desirable.

Accordingly therefore, an object of this invention is to automatically feed hooked lead wires.

Another object is to provide an apparatus for forming a hook in a lead wire after it has been selected from a supply thereof and before it is delivered to a head of a stem machine.

A further object is to provide an apparatus for selecting a lead wire from a supply thereof, flattening a portion thereof, and then forming a hook in the flattened portion.

A further object is to provide an apparatus for selecting a lead wire from a supply thereof, flattening a portion thereof, forming a hook in the flattened portion, and feeding the hooked lead wire to a head of a stem machine.

These and other objects, advantages and features of our invention will be apparent from the description below of a specific embodiment thereof.

In accordance with the principles of our invention, as illustrated in the specific embodiment thereof shown in the accompanying drawings and described below, a lead wire is selected from a supply thereof and fed to a mechanism for flattening a portion thereof. After the flattening operation has been completed, a hook is formed in the flattened portion and the hooked lead wire is then fed to a head of a stem machine.

In the specific embodiment of our invention shown in the accompanying drawings, Figure 1 is a side elevational view, partly in section, of the upper portion of a wire flattening, hooking and feeding apparatus.

Figure 1*a* is a side elevational view, partly in section, of the lower portion of the apparatus of Figure 1.

Figure 2 is a front view, partly in section, of the upper portion of a wire flattening, hooking and feeding apparatus.

Figure 2*a* is a front view, partly in section, of the lower portion of the apparatus of Figure 2.

Figure 3 is a front elevational view, partly in section, of the apparatus for selecting a lead wire from a supply thereof.

Figure 4 is a side elevational view, partly in section, of the apparatus of Figure 3.

Figure 1:
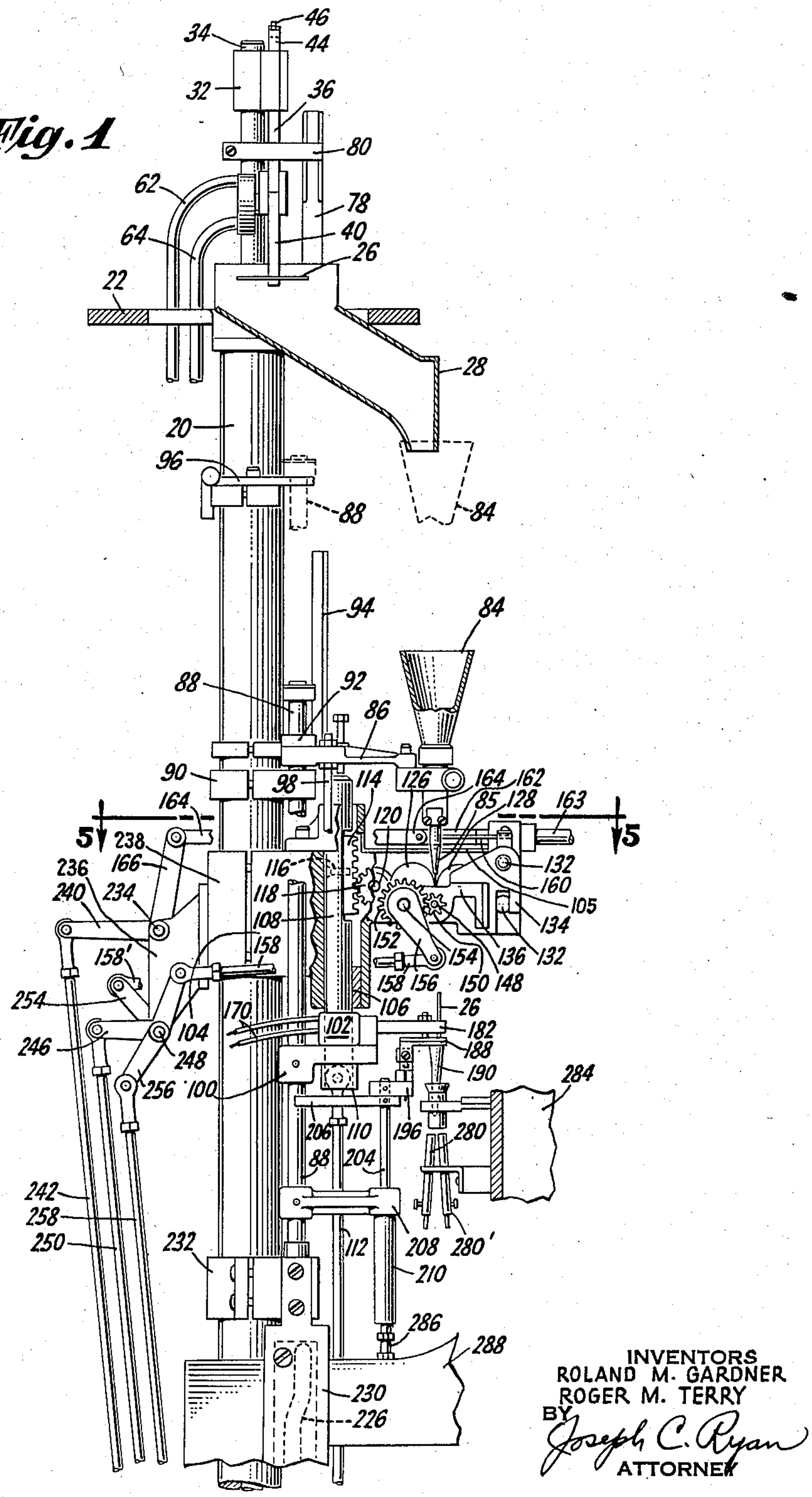

Figure 5 is a transverse sectional view taken along the line 5—5 of Figure 1, showing in plan the wire flattening rolls and their actuating mechanism, the mechanism for actuating the hook former, and a pair of jaws for transferring a hooked lead wire to a head of a stem machine. A portion of the cover plate on the casting in which the mechanism for actuating the wire flattening rolls is disposed is broken away, and one pair of wire-gripping jaws has been omitted, for clarity of illustration.

Figures 6, 7, 8:
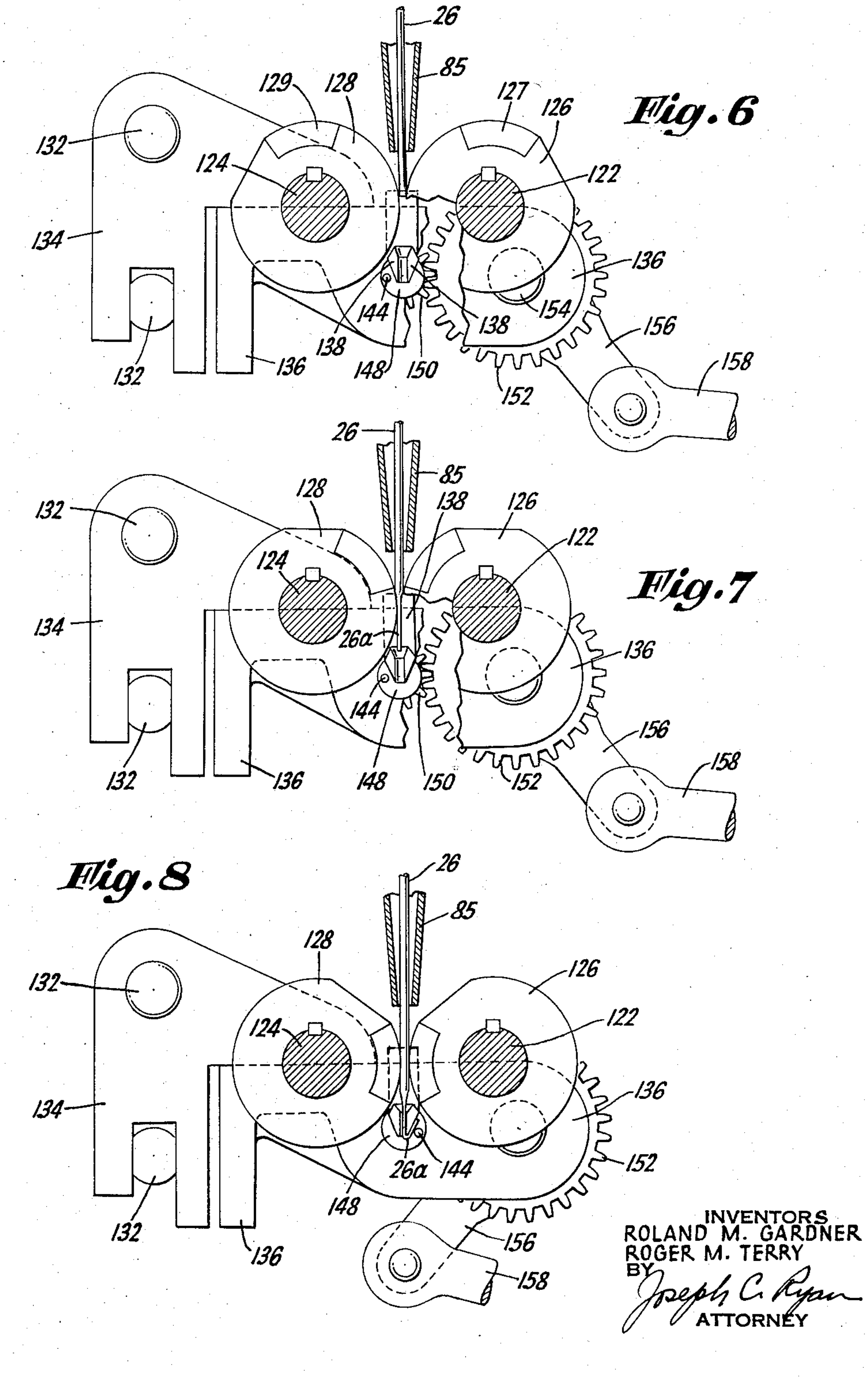

Figures 6, 7 and 8 are sectional views taken along the line 6—6 of Figure 5 sequentially illustrating the wire flattening and hooking operations.

Figure 9:
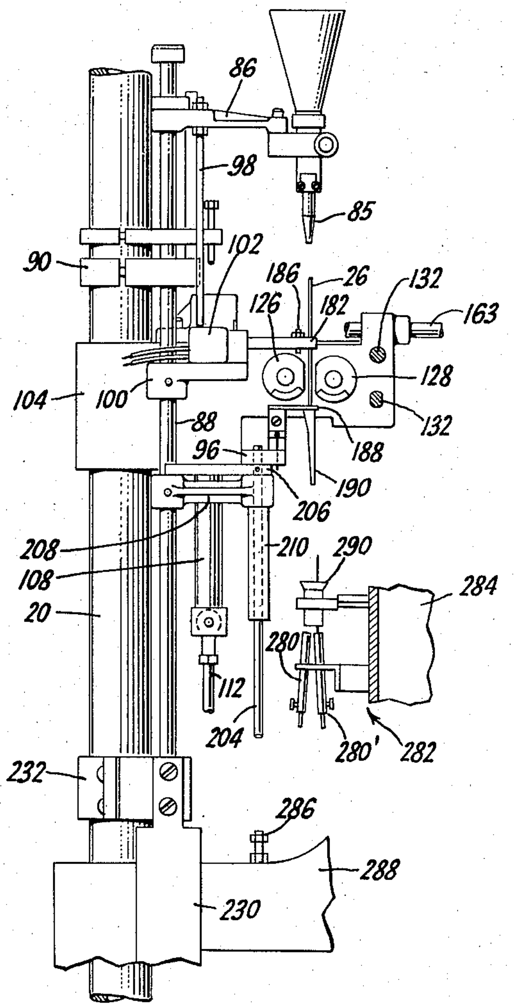

Figure 9 is a side elevational view of the upper portion of the wire flattening, hooking and feeding apparatus showing the relative disposition of the several parts thereof after the flattening and hooking operations have been performed and before the wire is fed to a head of the stem machine.

Figures 10, 11:
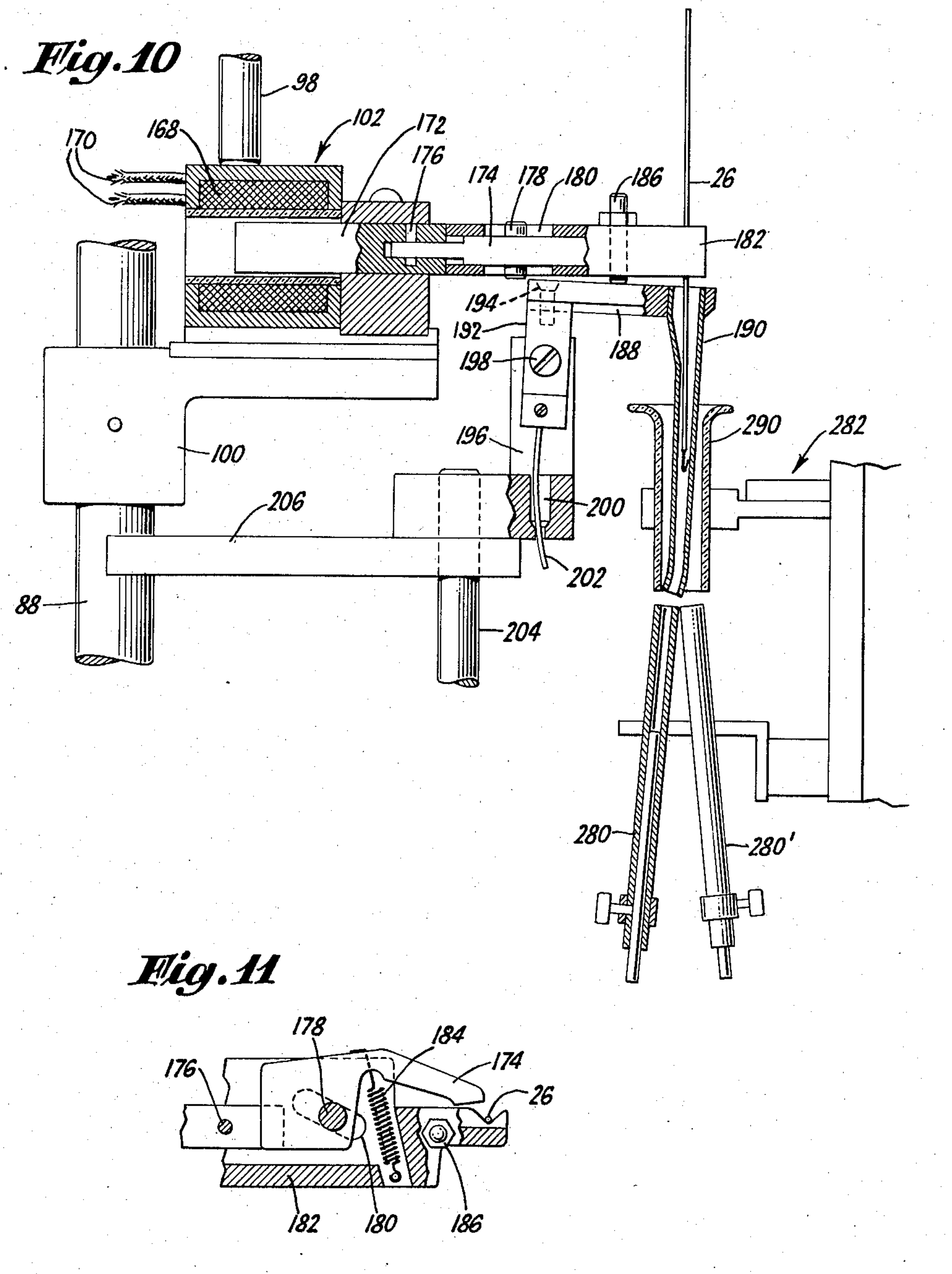

Figure 10 is a side elevational view, partly in section, of the mechanism for delivering a hooked lead wire to a head of the stem machine, showing its disposition at the end of the delivery stroke and its relationship with respect to the wire guiding tube.

Figure 11 is a plan view, partly in section of the jaws which deliver the hooked lead wire to the head of a stem machine as in Figure 10.

Referring now to Figures 1, 2, 3 and 4, post 20, on or about which most of the mechanisms which comprise the apparatus of this invention are disposed, is provided with a table 22 at the top thereof. Receptacles 24 and 24', within which a plurality of lead wires 26 and 26' are disposed, are mounted on the top face of the table 22 and chutes 28 and 28' depend therefrom. The receptacles 24 and 24' are provided with barriers 30 and 30' for controlling the movement of lead wires 26 and 26'. Since two lead wires are fed at the same time by identical mechanisms, only one mechanism will be described. Primed reference numbers have been assigned to the corresponding parts of the other mechanism shown in the drawings.

The mechanism for selecting a lead wire 26 from the receptacle 24 and delivering it to the chute 28 is supported from a bracket 32 attached to an end of rod 34 which extends through and is reciprocable within post 20. This mechanism comprises rod 36 depending from and reciprocably disposed within bracket 32, block 38 attached to rod 36, and lead-wire pick-up finger 40 mounted on sleeve 42 which is rotatably disposed within block 38. Rod 36 is provided with a lateral extension 44 through which a screw 46, which serves as an adjustable stop, extends. The pick-up finger 40 has a chamber 48 therein extending from the mouth 50 thereof to sleeve 42. Movable valve plate 52, which is mounted on sleeve 42, has a manifold 54 formed therein, through which communication is established alternately to ports 56 and 58 in fixed valve plate 60. Ports 56 and 58 are connected to a source of compressed air and a vacuum pump respectively through tubes 62 and 64 respectively. Valve plate 60 is held fixed by a stiff wire 66 which is attached at one end thereof to plate 60 by screws 68, the other end thereof being fixedly attached to block 38. Valve plates 52 and 60 are maintained in close frictional engagement with one another by spring-loaded pin 70 formed integral with valve plate 52. Pick-up finger 40 has a laterally extending protuberance 72 which, during the operation of the finger 40 as will be described more fully below, moves into and out of engagement with a pin 74 which lies in its path. Pin 74 is mounted in a bracket 76 attached to a post 78 mounted on table 22. Post 78, in conjunction with bifurcated plate 80 which is mounted on rod 34 and through the bifurcation of which the post 78 extends, serves to maintain the lead-wire feeding mechanism in correct alignment by preventing lateral displacement thereof. The movable valve plate 52 is spring loaded by spring 82, one end of which rides on extension 41 of pick-up finger 40 and the other end thereof being attached to block 38.

Figure 2:
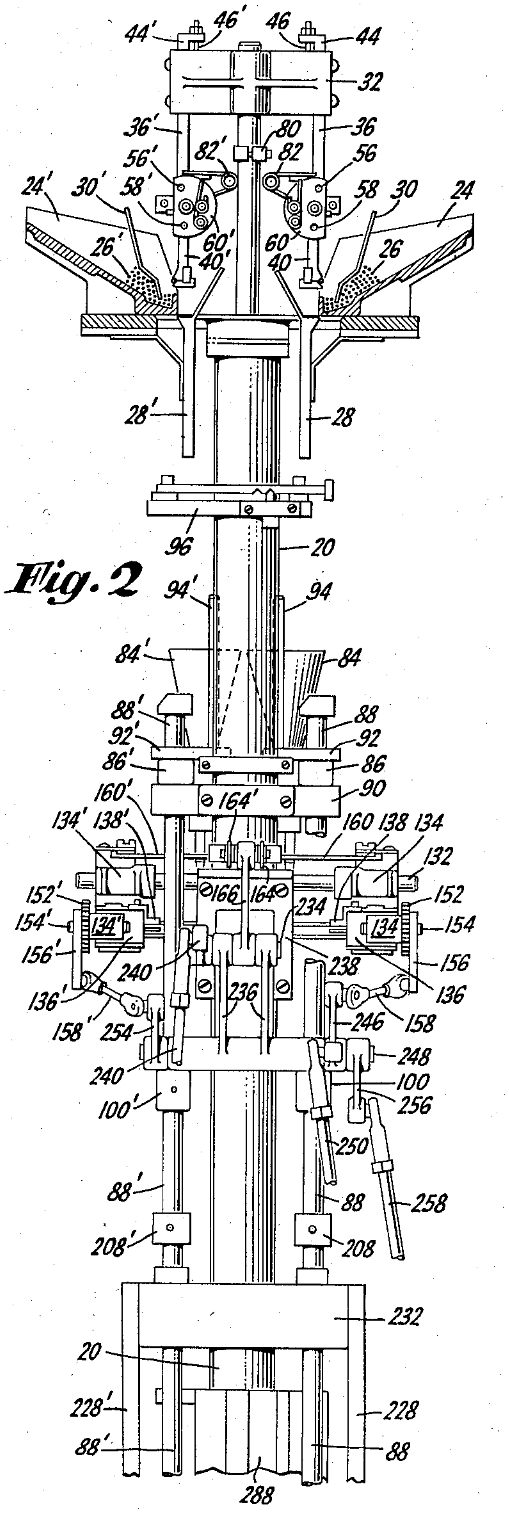
Figure 2A:
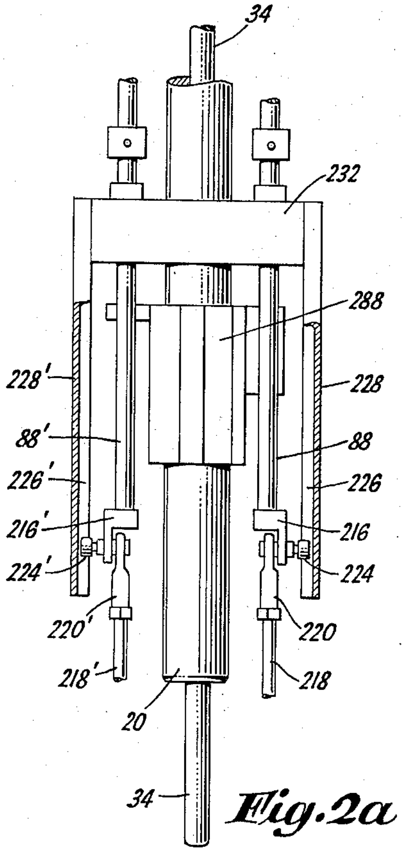

Referring now to Figures 1 and 2, lead wires 26 and 26', which are deposited in chutes 28 and 28' by pick-up fingers 40 and 40', are received from the chutes 28 and 28' by funnels 84 and 84'. Funnels 84 and 84' are mounted on arms 86 and 86' which are slidably disposed on rods 88 and 88'. In the rest position, arms 86 and 86' seat on collar 90 fixedly mounted on the post 20. Since the arms 86 and 86' are slidably disposed on rods 88 and 88', means are provided for preventing lateral displacement of these arms. This means comprises a pair of bifurcated arms 92 and 92' mounted on the top faces of arms 86 and 86' and attached thereto, and a pair of rods 94 and 94' mounted on the collar 90. Thus when rods 88 and 88' are reciprocated to raise and lower funnels 84 and 84' as will be described more fully below, the funnels are maintained in proper vertical alignment. A latching mechanism 96 fixedly mounted on post 20 serves as a means for locking rods 88 and 88' in the "up" position as shown in phantom (Fig. 1). Funnels 84 and 84' are raised from the position shown in solid to the position shown in phantom (Fig. 1) by rods 98 and 98' which are fixedly mounted in and depend from the arms 86 and 86' on which the funnels are mounted. Rods 98 and 98' are so actuated when rods 88 and 88' are moved upwardly, the upward movement of rods 88 and 88' being translated into similar movement of rods 98 and 98' through arms 100 and 100' fixedly mounted on rods 88 and 88' and the casing of solenoids 102 and 102' mounted on the arms 100 and 100', the top face of the casing of solenoids 102 and 102' moving into engagement with and pushing upwardly the rods 98 and 98' (Figs. 1 and 10).

Referring now to Figures 1, 2 and 5, post 20 has a casting 104 fixedly mounted thereon by cap 238, the casting 104 serving as a mounting and supporting member for the lead-wire flattening mechanism which will now be described. Casting 104 is provided with a bore 106 within which shaft 108 is disposed. Shaft 108 is connected through yoke 110 to connecting rod 112. Rack 114, attached to shaft 108 by screw 116, meshes with gear 118 disposed within a cavity in casting 104 and mounted on shaft 120 journaled in the wall of casting 104. The casting 104 is provided with a cover plate 105 which serves to close the cavity and thereby protect the mechanism therein. Shafts 122 and 124 (Figs. 6, 7 and 8), which are also journaled in the walls of the casting 104, have wire flattening rolls 126 and 126' and wire flattening rolls 128 and 128' respectively (Fig. 5) mounted on the ends thereof. Shaft 122 is driven by the rack and gear 114 and 118 through gear 130 mounted on shaft 122. Shaft 124 is driven from gear 130 by a similar gear (not shown) mounted on shaft 124.

Rods 132, extending transversely of and mounted on an end of casting 104 have crossheads 134 and 134' slidably disposed thereon. Arms 136 and 136', attached to the crossheads 134 and 134', support the lead wire hook forming mechanisms, each of which comprises a slotted anvil 138 mounted on and depending from arm 136 (Figs. 5, 6, 7 and 8), and pin 144 eccentrically mounted on one end of shaft 148. Shaft 148 extends through arm 136 and has a gear 150 mounted on the other end thereof. Gear 150 meshes with gear 152 mounted on shaft 154 journaled in the side of arm 136. One end of lever 156 is mounted on shaft 154, the other end thereof being attached to connecting rod 158.

The crossheads 134 and 134', which are slidably disposed on rods 132, are connected by links 160 and 160' to block 162 attached to rod 163 journaled in casting 104. Arms 164 and 164' connect block 162 to lever 166.

Referring now particularly to Figures 1, 5, 10 and 11, the mechanism for carrying a lead wire from the flattening and hooking mechanisms shown particularly in Figures 6, 7 and 8 to a position in vertical alignment with a head of the stem making machine will now be described. Solenoid 102, which is mounted on arm 100 pinned to rod 88, comprises a coil 168 having lead wires 170 extending therefrom and a core 172 slidably disposed therein (Fig. 10). A movable jaw 174 (Fig. 11) is pivotally mounted at 176 on the core 172. The movable jaw 174 is provided with a pin 178 which rides in a slot 180 in a fixed jaw 182. Spring 184, which connects the fixed jaw 182 to the movable jaw 174, loads the movable jaw and tends to urge it to a closed position with respect to the fixed jaw. The fixed jaw 182 is provided with an adjustable screw 186 extending therethrough and engageable with arm 188, on the outer end of which wire guiding tube 190 is mounted. Arm 188 is attached to block 192 by screw 194. Block 192 is pivotally mounted on the vertical leg of bracket 196 by shoulder screw 198. The horizontal leg of bracket 196 is provided with a bore 200 through which flexible wire 202, which is attached to and depends from block 192, extends. Bracket 196 is fixedly mounted on rod 204 near the top thereof. Arm 206, which is fixedly mounted at one end thereof on rod 204 immediately beneath bracket 196, is bifurcated at the other end thereof and partially encircles rod 88, thereby controlling the vertical alignment of rod 204. Actuation of rod 204 (Fig. 1) is effected by rod 88 through arm 208 which connects these two rods to one another. One end of arm 208 is fixedly mounted on rod 88; the other end of arm 208 is slidably disposed on rod 204 and has a depending sleeve 210 through which rod 204 extends. When rod 88 moves upwardly carrying the arm 208 with it, the arm 208 and its sleeve 210 moves upwardly on rod 204 until its strikes arm 206 which is fixedly mounted on rod 204; then further upward movement of rod 88 carries arm 206, rod 204, and the several members supported thereon upwardly to bring the wire guiding tube 190 into wire-receiving position directly beneath the anvil 138 and pin 144 which comprise the hook-forming mechanism (Figs. 6, 7 and 8).

The drive mechanisms, for actuating the several operating devices just described, will now be described, referring particularly to Figures 1, 1*a*, 2 and 2*a*. Generally speaking the drive mechanisms consist of a plurality of cams on a cam shaft and a plurality of lever arms on a lever arm shaft with connecting rods translating the motions to the devices which operate on the work.

Rod 34, which actuates the wire pick-up mechanism and which extends through and is reciprocable within post 20, rests on one end of lever arm 212 mounted on lever arm shaft 214. Lever arm 212 is provided with a cam roller 212*a* which rides on cam 212*b* mounted on cam shaft 213.

Rods 88 and 88', which reciprocate the funnels 84 and 84' through arms 100 and 100' and rods 98 and 98', and which reciprocate wire guiding tubes 190 and 190' through arms 208 and 208' and rods 204 and 204', are each provided at one end thereof with a yoke 216 (Fig. 1*a*) which is connected to connecting rod 218 through rod end 220. The other end of rod 218 is connected to lever arm 222 mounted on lever arm shaft 214. Lever arm 222 is provided with a cam roller 222*a* which rides on cam 222*b* mounted on cam shaft 213. Yoke 216 is provided with a cam follower 224 which rides in a cam track 226 formed in stationary cam 228 mounted on and depending from plate 230 attached to collar 232 fixedly mounted on post 20.

Lever 166 (Fig. 1), which drives the crossheads 134 and 134' on rods 132, is mounted on shaft 234 journaled in plate 236 attached to cap 238 on post 20. Lever 240, mounted on shaft 234, connects lever 166 to one end of connecting rod 242. The other end of rod 242 is connected to lever arm 244 which is mounted on lever arm shaft 214. The lever arm 244 is provided with a cam follower 244a which rides on cam 244b mounted on cam shaft 213.

Rod 158 (Fig. 1), which is connected through lever 156 and gears 152 and 150 to the pin 144 of the hook forming mechanism (Figs. 6, 7 and 8), is connected at one end thereof to bellcrank lever 246 supported on shaft 248 but freely rotatable thereon. Bell crank lever 246 is connected through connecting rod 250 to lever arm 252 mounted on lever arm shaft 214. Lever arm 252 is provided with a cam follower 252a which rides on cam 252b mounted on cam shaft 213.

Rod 158' (Figs. 1 and 5), which is connected to the hook forming mechanism on the side of the apparatus opposite that shown in Figure 1, is connected to a lever 254 fixedly mounted on one end of shaft 248. Lever 256, fixedly mounted on the other end of shaft 248, is connected through connecting rod 258 to lever arm 260 (Fig. 1*a*) mounted on lever arm shaft 214. Lever arm 260 is provided with a cam follower 260a which rides on cam 260b mounted on cam shaft 213.

Connecting rod 112, which is connected to shaft 108 on which the rack 114 for actuating the wire flattening rollers 126 and 128 is mounted, is connected to lever arm 262 (Fig. 1*a*) mounted on lever arm shaft 214. Lever arm 262 is provided with a cam follower 262a which rides on cam 262b mounted on cam shaft 213.

Figure 1A:
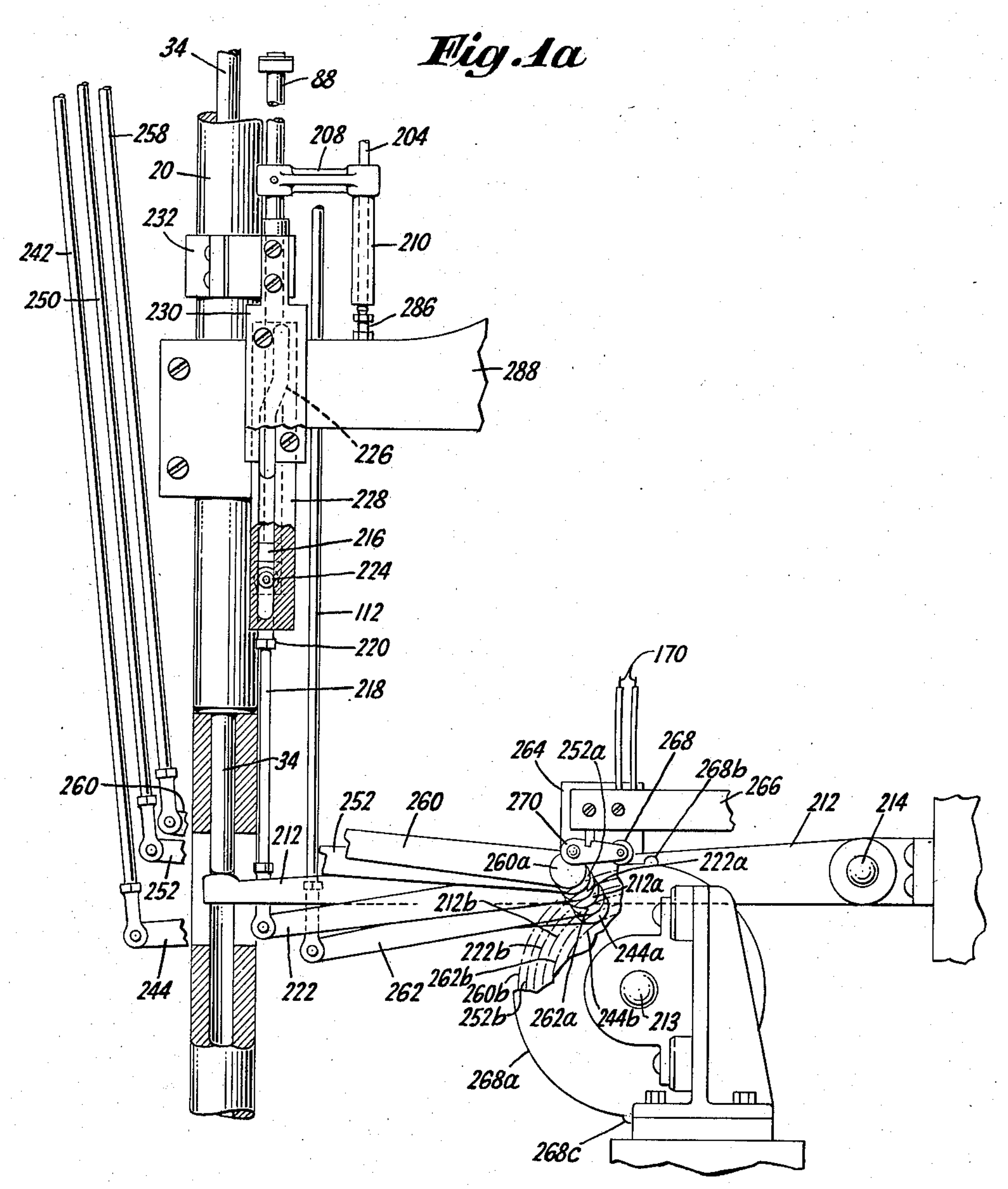

Solenoid 102 (Figs. 1, 10 and 11), which controls the opening of movable jaw 174 of jaws 174 and 182 which carry the lead wire from the flattening rolls 126 and 128, has lead wires 170 extending therefrom which are connected to switch 264 (Fig. 1*a*). Switch 264 which is mounted on a suitable fixed support 266, is cam-actuated through cam follower 268 on arm 270 pivotally supported on and depending from switch 264. Cam follower 268 rides on cam 268a mounted on cam shaft 213, the cam 268a having lobes 268b and 268c thereon.

The first step in the operation of the above-described apparatus is the selection of a lead wire 26 and a lead wire 26' from their respective receptacles 24 and 24' and the feeding of the lead wires to their respective chutes 28 and 28'. Since the two lead wires 26 and 26' are fed at the same time by identical mechanisms, the operation of only one of them will be described. Rod 34 is reciprocated within the post 20 (Fig. 1*a*) by lever shaft 212, cam roller 212a and cam 212b to thereby effect reciprocation of bracket 32 which is mounted theron (Figs. 1 and 2) and reciprocation of rod 36 which is supported from bracket 32. Reciprocation of rod 36 (Figs. 3 and 4) effects similar movement of the lead wire pick-up finger 40 to which the rod 36 is connected through block 38 and sleeve 42. The receptacle 24 has an opening of substantial size in its front face so that when the finger 40 reciprocates, the mouth 50 thereof will brush against the stack of lead wires and draw one of the lead wires thereagainst and retain it due to the suction induced by a vacuum pump connected through tube 64, port 58, manifold 54, sleeve 42 and chamber 48 in the finger 40. With a lead wire 26 held in the mouth 50 of the finger 40, the finger 40 is moved upwardly (Fig. 3) until the protuberance 72 thereon strikes pin 74. With the further upward movement of the finger 40 thus arrested, the further upward movement of rod 36 causes the finger 40 to rotate from the position shown in solid to the position shown in phantom in Figure 3. When the finger 40 rotates to the position shown in phantom in Figure 3, the movable valve plate 52 rotates therewith, thereby moving port 58 out of register with manifold 54 and moving port 56 into register with manifold 54. Compressed air fed to port 56 through tube 62 thus blows lead wire 26 out of the mouth 50 of finger 40 and into chute 28. At the start of the next cycle of operation of finger 40, i. e., as the finger 40 starts its downward travel and the protuberance 72 moves away from engagement with pin 74, spring 82 returns the movable valve plate 52 to a position where the vacuum line 64 and port 58 are in register with manifold 54.

The lead wire 26 falls from the chute 28 (Fig. 1) through funnel 84 and into nozzle 85 which guides the end thereof into engagement with the peripheries of flattening rolls 126 and 128 (Fig. 6). The wire 26 is now in position for execution thereon of the wire flattening operation. This is accomplished by rotation of the flattening rolls 126 and 128 to draw the wire 26 downwardly therebetween from the position shown in Figure 6 to the position shown in Figure 7. The flattening rolls 126 and 128 are rotated to effect this operation by cam 262b (Fig. 1*a*) through cam roller 262a, lever shaft 262, connecting rod 112, yoke 110 (Fig. 1), shaft 108, rack 114, gear 118 (Fig. 5) and gears 130 mounted on shafts 122 and 124 (Fig. 6) on which flattening rolls 126 and 128 are mounted.

With the flat 26a now made on the end of lead wire 26 (Fig. 7), the hook forming mechanism (Fig. 5) disposed on arm 136 must be brought inwardly from the position shown in Figure 5 to operable relationship with respect to the flat 26a. This is accomplished by cam 244b (Fig. 1*a*) through cam follower 244a, lever shaft 244, connecting rod 242, lever 240 (Fig. 1), shaft 234, lever 166, arm 164 (Fig. 5), block 162, link 160, and crosshead 134 slidably disposed on rods 132. As the block 162 moves to the left in Figure 5, the link 160 draws the crosshead 134, which carries the arm 136, inwardly, thus moving the slotted anvil 138 into position in register with the end of lead wire 26. The flattening rolls 126 and 128 are further rotated to draw the flat 26a down through the slot in anvil 138, thereby positioning the lead wire 26 for execution thereon of the hook forming operation. During this portion of the rotation of flattening rolls 126 and 128, the wire 26 is drawn downwardly by the flexible pads 127 and 129 of the rolls 126 and 128 which prevent further flattening of the wire 26.

The hook forming mechanism is actuated by cam 252b (Fig. 1*a*) through cam follower 252a, lever shaft 252, connecting rod 250, bellcrank lever 246 (Fig. 1), connecting rod 158, lever 156, shaft 154, gear 152, gear 150 mounted on one end of shaft 148 and pin 144 (Figs. 7 and 8) eccentrically mounted on the other end of shaft 148. Rotation of shaft 148 by this mechanism causes the eccentrically mounted pin 144 to swing into engagement with the flat 26a of lead wire 26 and bend it back against the outside face of anvil 138, thereby forming the hook (Fig. 8).

A separate similar mechanism is employed to actuate the hook forming mechanism on the side of the apparatus opposite that shown in Figure 1 to form the hook in lead wire 26'. It is actuated by cam 260b (Fig. 1*a*) through cam follower 260a, lever arm 260, connecting rod 258, lever 256, shaft 248, lever 254, and connecting rod 158' (Fig. 5).

As soon as the hooks have been formed on the ends of lead wires 26 and 26', the hook forming mechanisms are immediately retracted to permit the wire gripping jaws 174 and 182 and 174' and 182' (Figs. 1, 5 and 11) to be moved into wire gripping position. This is accomplished by the return stroke of crossheads 134 and 134' on rods 132 to the position shown in Figure 5. The jaws 174 and 182 are raised from the position in which they are shown in Figure 1 to the position in which they are shown in Figure 9 by the rod 88. The rod 88 is moved upwardly by cam 222b (Fig. 1*a*), cam follower 222a, lever arm 222, connecting rod 218, rod end 220, and yoke 216 to which an end of rod 88 is connected. Since arm 100 is fixedly mounted on rod 88, solenoid 102 and jaws 174 and 182 are moved upwardly therewith. As the rod 88 approaches the end of its upward travel, cam follower 224 (Fig. 1*a*) enters and passes through the transverse portion of the cam track 226, thereby effecting rotation of rod 88. This rotation of rod 88 carries the wire gripping jaws from the position in which they are shown in the upper half of Figure 5 to a position in register and in operable relationship with respect to the lead wire held between the wire flattening rolls.

Since the funnel 84 and the nozzle 85 depending therefrom are normally in the position shown in Figure 1, they must be elevated a distance sufficient to permit the wire gripping jaws 174 and 182 to move into operable relationship with respect to the lead wire 26 held by the flattening rolls 126 and 128. This elevation of the funnel 84 and its depending nozzle 85 is effected as the rod 88 approaches the end of its upward travel because at that time the top of solenoid 102 engages the bottom of rod 98 depending from arm 86 in which the funnel 84 is mounted and pushes the rod 98 upwardly, raising the arm 86 and the funnel 84 upwardly from the position shown in Figure 1 to the position shown in Figure 9.

The rod 88 not only moves the wire gripping jaws upwardly into operable relationship with respect to the lead wire 26 held by the flattening rolls 126 and 128, but it also moves the wire guiding tube 190 into position beneath the wire gripping jaws. As the rod 88 moves upwardly (Fig. 1), it carries with it the arm 208 which is fixedly mounted thereon and the sleeve 210 rides along on rod 204. Since arm 208 moves into engagement with the lower face of arm 206 before the rod 88 has completed its upward travel, the arm 206 and its associated parts including wire guiding tube 190 are moved upwardly during the remainder of the upward travel of rod 88, being disposed, at the end of the upward stroke of rod 88, in the position shown in Figure 9.

With the wire gripping jaws 174 and 182 in wire-receiving relationship with respect to the wire 26 held by flattening rolls 126 and 128, and the wire guiding tube 190 disposed beneath the wire gripping jaws and in register with the wire 26, the next two operations performed are gripping of the wire by the jaws and release of the wire by the flattening rolls. Since switch 264 (Fig. 1*a*), to which solenoid 102 (Fig. 1) is connected by wires 170, is normally open, thereby permitting spring 184 to keep movable jaw 174 (Fig. 11) closed with respect to stationary jaw 182, it must be closed to draw movable jaw 174 open with respect to stationary jaw 182 to receive lead wire 26. This action occurs when lobe 268*c* (Fig. 1*a*) on cam 268*a* moves into contact with and deflects pivotally mounted arm 270. At about the same time that the movable jaw 174 closes with respect to stationary jaw 182 to grip the lead wire 26, the flattening rolls 126 and 128 (Fig. 9) rotate to a position where the flattened portions of their peripheries are opposite one another, thereby releasing the lead wire 26 to the wire gripping jaws 174 and 182.

Delivery of lead wire 26 by jaws 174 and 182 to wire receiving tube 280 (Fig. 9) of stem head 282 mounted on the rotatable table 284 of a stem machine is effected by the return or downward stroke of rod 88. The return stroke of rod 88 effects a return of funnel 84, jaws 174 and 182, and wire guiding tube 190 to their respective positions as shown in Figure 1. The funnel 84 drops down with the return of rod 88 until the arm 86 on which it is mounted seats on collar 90 fixedly mounted on post 20. Wire guiding tube 190 moves downwardly until rod 204, on which arm 206 is fixedly mounted, strikes stop 286 mounted on arm 288 attached to post 20. Although arm 208 is fixedly mounted on rod 88, the further downward travel of rod 88 after rod 204 strikes stop 286 is taken up by sleeve 210 sliding on rod 204. Thus wire guiding tube 190 is disposed as shown in Figures 1 and 10 before rod 88 completes its return stroke. Since wire gripping jaws 174 and 182 travel downwardly the same distance as rod 88 because they are fixedly mounted thereon through solenoid 102 and arm 100, the wire gripping jaws, in their further downward travel, thread wire 26 (Fig. 10) into the wire guiding tube 190 which now extends into the lamp flare 290 of the stem head 282. Since block 192 is pivotally mounted on the vertical leg of bracket 196 by shoulder screw 198, engagement of the top face of arm 188 by screw 186 extending through fixed jaw 182 causes a slight clockwise rotation of wire guiding tube 190, arm 188 and block 192 about screw 198 as a pivot as is shown in Figure 10, thereby canting the wire guiding tube 190 enough to channel the lead wire 26 into wire receiving tube 280 when the wire is released by jaws 174 and 182. Solenoid 102 is now energized to retract the core 172 thereof and the movable jaw 174 connected thereto to effect a release of the wire 26, thus permitting it to drop into wire receiving tube 280. Energization of the solenoid occurs when cam follower 268*a* rides over lobe 268*b* on cam 268*a* (Fig. 1*a*), thereby deflecting the pivotally mounted arm 270 and causing a closing of the switch 264.

Canting of wire guiding tube 190′ on the side of the apparatus opposite that just described, in order to effect a similar positioning of lead wire 26′ to guide it into wire receiving tube 280′ is effected by a mechanism (not shown) similar to screw 186 except that, it consists of a protuberance extending laterally from block 192′ which is engaged and deflected by an extension of arm 100′ as the rod 88 approaches the end of its return travel, this modification being necessary to provide a counterclockwise rotation of wire guiding tube 190′ to direct wire 26′ into wire receiving tube 280′.

When the rod 88 starts its upward travel for the next cycle of operation, the force exerted on arm 188 by a screw 186 (Fig. 10) is relieved and the flexible wire 202 returns the block 192 to which it is connected to its normal position and thus effects a return of wire guiding tube 190 to its true vertical position.

What we claim is:

1. The combination, with a stem machine having a plurality of heads for supporting stem elements and movable to a plurality of work stations, of a wire flattening, hooking and loading apparatus disposed adjacent to said stem machine at one of the work stations thereof, said apparatus comprising: a pair of rolls disposed side-by-side in the same plane and normally spaced from one another a distance less than the diameter of the wire, and having a wire-feeding end and a wire-delivery end, the periphery of each of said rolls having a wire-flattening portion and a wire-feeding portion; an anvil mounted adjacent to the said wire-delivery end of said rolls and disposed in alignment with the space defined by the adjacent peripheral portions of said rolls; a wiper mounted adjacent to said anvil and in cooperative relationship with respect thereto; means for feeding individual pre-cut wires end-on to said wire-feeding end of said rolls; means for rotating said rolls to draw one of said wires therebetween, firstly by the said wire-flattening portions thereof to effect a flattening of a portion of said wire and secondly by the said wire-feeding portions thereof to feed the flattened portion of said wire to said anvil; means for moving said wiper into engagement with the flattened portion of said wire and bending it over said anvil to form a hook; means for releasing the hooked wire from the said rolls; and means for transferring the hooked wire, immediately upon its release from said rolls, to a head of the stem machine.

2. The combination, with a stem machine having a plurality of heads for supporting stem elements and movable to a plurality of work stations, of a wire flattening, hooking and loading apparatus, disposed adjacent to said stem machine at one of the work stations thereof, said apparatus comprising: a pair of rolls disposed side-by-side in the same plane and normally spaced from one another a distance less than the diameter of the wire, and having a wire-feeding end and a wire-delivery end, the periphery of each of said rolls having a wire-flattening portion and a wire-feeding portion; a hook forming mechanism mounted adjacent to the said wire-delivery end of said rolls; means for feeding individual pre-cut wires end-on to said wire-feeding end of said rolls; means for rotating said rolls to draw one of said wires therebetween, firstly by the said wire-flattening portions thereof to effect a flattening of a portion of said wire and secondly by the said wire-feeding portions thereof to feed the flattened portion of said wire to the said wire-delivery end of said rolls; means for reciprocating said hook forming mechanism into and out of operative relationship with respect to the flattened portion of said wire at the wire-delivery end of said rolls to form a hook thereon; a wire transfer mechanism mounted between said rolls and a head of said stem machine; and means for reciprocating said wire transfer mechanism between said rolls and said head of said stem machine to effect a transfer of the flattened, hooked wire from said rolls to said head of the stem machine.

References Cited in the file of this patent

UNITED STATES PATENTS

| | | |
|---|---|---|
| 1,187,472 | Sisson | June 13, 1916 |
| 1,669,833 | McColl | May 15, 1928 |
| 1,751,434 | Wildeboer | Mar. 18, 1930 |
| 1,801,119 | Soepnel | Apr. 14, 1931 |
| 1,930,316 | Ledig | Oct. 10, 1933 |
| 1,968,802 | Powers | July 31, 1934 |
| 2,114,844 | Krause | Apr. 19, 1938 |
| 2,329,769 | Kinyon | Sept. 21, 1943 |
| 2,361,983 | Veley | Nov. 7, 1944 |
| 2,575,771 | Russell | Nov. 20, 1951 |